(12) United States Patent
Hu et al.

(10) Patent No.: US 8,280,206 B2
(45) Date of Patent: Oct. 2, 2012

(54) WSS WITH HITLESS SWITCHING

(75) Inventors: Qianggao Hu, Hubei (CN); Liping Sun, Hubei (CN); Liu Yang, Hubei (CN); Zhilin Yuan, Hubei (CN); Hui Xie, Hubei (CN); Rui Yang, Hubei (CN)

(73) Assignee: Accelink Technologies Co., Ltd., Wuhan, Hubei (CN)

( * ) Notice: Subject to any disclaimer, the term of this patent is extended or adjusted under 35 U.S.C. 154(b) by 173 days.

(21) Appl. No.: 12/643,922

(22) Filed: Dec. 21, 2009

(65) Prior Publication Data

US 2011/0150389 A1  Jun. 23, 2011

(51) Int. Cl.
G02B 6/35 (2006.01)
G02B 6/26 (2006.01)
G02B 6/28 (2006.01)

(52) U.S. Cl. ............... 385/18; 385/15; 385/17; 385/19; 385/24; 385/47

(58) Field of Classification Search ............ 385/18
See application file for complete search history.

(56) References Cited

U.S. PATENT DOCUMENTS

| 2007/0077003 A1 | 4/2007 | Aota et al. | |
| 2009/0028503 A1* | 1/2009 | Garrett et al. | 385/18 |
| 2010/0061727 A1* | 3/2010 | Colbourne et al. | 398/48 |

FOREIGN PATENT DOCUMENTS

| CN | 1831574 A | 9/2006 |
| CN | 101194194 A | 6/2008 |

OTHER PUBLICATIONS

Gao, Xiaoping. "Micro Electro-mechanical System(MEMS) optical switches". OME Information, 2001 No. 12, p. 30-35.

* cited by examiner

Primary Examiner — Michelle R Connelly
(74) Attorney, Agent, or Firm — George G. Wang; Bei & Ocean

(57) ABSTRACT

A wavelength selective switch (WSS) with hitless switching. The WSS includes the fiber collimator array, the focusing lens, collimating lens, diffraction grating, focusing lens, and attenuation reflection unit array. Each attenuation reflection unit has an interconnected transmission-type MEMS attenuator and a one-dimension MEMS reflector. The transmission-type MEMS attenuator is positioned in the front of the one-dimension MEMS reflector. The central axis of the transmission-type MEMS attenuator aligns and coincides with that of the one-dimension MEMS reflector, with the two central axes being glued together. The WSS of the present invention effectively utilizes the combination of a one-dimension reflector array and a transmission-type optical attenuator chip. With the use of one-dimension reflector array, instead of the known two-dimension reflector array, the complexity of design and manufacture is greatly reduced, thereby reducing the production costs of the switch.

8 Claims, 6 Drawing Sheets

(a)

(b)

(a)

(b)

WSS WITH HITLESS SWITCHING

FIELD OF THE INVENTION

This invention relates to a wavelength selective switch (referred to as WSS), particularly to a WSS which can realize the functions of optical path switching, attenuation, and hitless switching using a one-dimension reflector array.

BACKGROUND OF THE INVENTION

With the development of the wavelength division system, requirements on the flexibility of the system have increased. WSS can attenuate and switch any wavelength to any port and provides a technical platform necessary for flexible integration of optical networks and has gradually gained acceptance.

As the core equipment of optical transfer networks and reconfigurable optical add-drop multiplexers (referred to as ROADM), the WSS offers more convenience in developing new business and reducing operation costs for network operation. Firstly, when providing business at the wavelength level for large business clients, with the use of ROADM nodes, it is possible to configure the network system remotely through network management systems. With such remote configuration, it greatly facilitates the development of new business areas and enables faster responses to clients' changing demands. Secondly, the application of ROADM facilitates network planning and reduces the operating expenses. For rapid and unpredictable business clients, ROADM can provide node reconstruction abilities to make it possible that the network based on Dense Wavelength Division Multiplexing (referred to as DWDM) can also now conveniently reconstructed, thereby greatly reducing the requirement on network planning. In addition, the ability to handle network emergencies is enhanced, which in turn improves the overall efficiency of the entire network. Moreover, the application of ROADM is convenient for maintenance and reduces maintenance costs. If ROADM is adopted, most daily operations and maintenance, including setups for new clients and cable line adjustments can be executed by network management without manual operation, which in turn improves work efficiency and reduces maintenance costs. As a new generation of product, the WSS makes optical network layer realize full automation at wavelength level.

Chinese patent CN1831574A has disclosed a wavelength selective switch (WSS), which includes a spectrum dispersing part, a movable reflector, movable reflector drive and reflected light monitor. The WDM (Wavelength Division Multiplexing) optical signal at the WSS input port is divided into individual wavelength channels by the spectrum, and the wavelength channel along different directions can be reflected by the corresponding movable reflector. The angle of the reflecting surface at each movable reflector corresponds to the position of the output port set in the output address of the wavelength channel to be reflected. The wavelength channel arriving at the target output port is reflected by the reflector on the output port, and the reflected light advances downwards along with the direction opposite to the previous optical path and is then returned to the input port. In addition, this WSS has the function of monitoring the reflected light. However, this patent can only realizes the function of optical path selection switch through rotating the reflector, but cannot perform the function of attenuation and hitless switching.

U.S. Pat. No. 7,092,599B2, as shown as FIG. 2, disclosed another type of wavelength selective switch, which was based on grating and LCD technology. However, due to the thermal characteristics of LCD, it is necessary to use a temperature control. The polarization performance is also poor, resulting in a slow response time. Therefore, its application is rather limited.

In recent years, Joseph E Davis of Capella Company has filed a number of patent applications related to WSS. The basic principle has not significantly changed, but new functions are continuously added to achieve better optical specifications. The WSS described in his latest patent application, 2006/0228071, is similar to the earlier patents, including a fiber collimator array, diffraction grating, optical lens, reflector array, and ¼ wave plate. Incident light signal after the split by diffraction grating is separated to individual wavelength channel light signals. The discrete channel optical signals are transmitted to a two-dimension reflector array. The two-dimension reflector array realizes signal deflection (wavelength selective switch) through rotation in one direction, and then realizes attenuation of each channel signal through rotation in the other direction. It teaches a method that achieves optical path switch selection through rotating the two-dimension reflector in one direction, and realizes attenuation and hitless switching through rotating the two-dimension reflector in the opposite direction.

For guaranteeing working bandwidth required for WSS, the smaller the gap between Micro-Electro-Mechanical Systems (MEMS) reflectors is, the better; that is to say, the bigger the fill factor is, the better. Generally speaking, a two-dimensional MEMS reflector has one more rotating axis than a one-dimensional MEMS reflector, and thus its fill factor is relatively smaller. The patent (U.S. Pat. No. 6,934,439 B2) issued to JDSU Company is specifically directed to a solution to overcome the smallness of the fill factor by designing a "plano"-type MEMS two-dimension reflector, as shown in FIG. 1 in the patent.

In summary, the existing WSS based on the two-dimension MEMS reflector technology has two issues: (1) high cost and (2) small fill factor. In addition, it is very difficult to design and manufacture two-dimension MEMS reflectors. The passing rate of finished products is low. Presently, only a few American and European companies can supply the WSS based on two-dimension MEMS reflector technology. Moreover, the cost for two-dimension MEMS reflectors is understandably high, leading to high prices of WSS.

SUMMARY OF THE INVENTION

A object of the present invention is to provide a WSS with hitless switching that can realize the switching function based on a one-dimension MEMS rotating mirror array and realize attenuation and hitless switching through a transmission-type MEMS attenuator.

This object is realized by fabricating a new wavelength selective switch (WSS) with hitless switching, which comprises a fiber collimator array, focusing lens, collimating lens, diffraction grating, and focusing lens arranged in the same order as listed. Located on the other side of the focusing lens is the attenuated reflection unit array. The array comprises a plurality of channel attenuation reflection units. The attenuation reflection array includes interconnected transmission-type MEMS attenuators. The transmission-type MEMS attenuator array is positioned in the front of the one-dimension MEMS reflectors.

The central axis of the transmission-type MEMS attenuator aligns and coincides with that of a reflector of the one-dimension MEMS reflector unit, with the two central axes glued together.

The WSS with hitless switching of this invention has the following features:

1. It effectively utilizes a perfect combination of a one-dimension reflector array and a transmission-type MEMS optical attenuator unit to realize the functions of optical path switching, attenuation, and hitless switching.

2. It the technical level, the one-dimension MEMS design is simpler than the two-dimension MEMS design, increases fill factors, and improves WSS's working bandwidth.

3. The WSS reflector changes from two dimensions to one dimension, therefore reducing technical complexities and costs.

where:

| | |
|---|---|
| 201 is fiber collimator arrays | 202 is focusing lens |
| 203 is collimating lens | 204 is diffraction grating |
| 205 is focusing lens | 206 is transmission-type MEMS attenuator |
| 207 is one-dimension MEMS reflector | 208 is transmission-type MEMS attenuator |
| 209 is incident ray | 210 is reflected ray |

The various features of novelty which characterize the invention are pointed out with particularity in the claims annexed to and forming a part of the disclosure. For a better understanding of the invention, its operating advantages, and specific objects attained by its use, reference should be made to the descriptive matter in which there are illustrated and to described preferred embodiments of the invention.

DETAILED DESCRIPTION OF PARTICULAR EMBODIMENTS OF THE INVENTION

Figure 1:
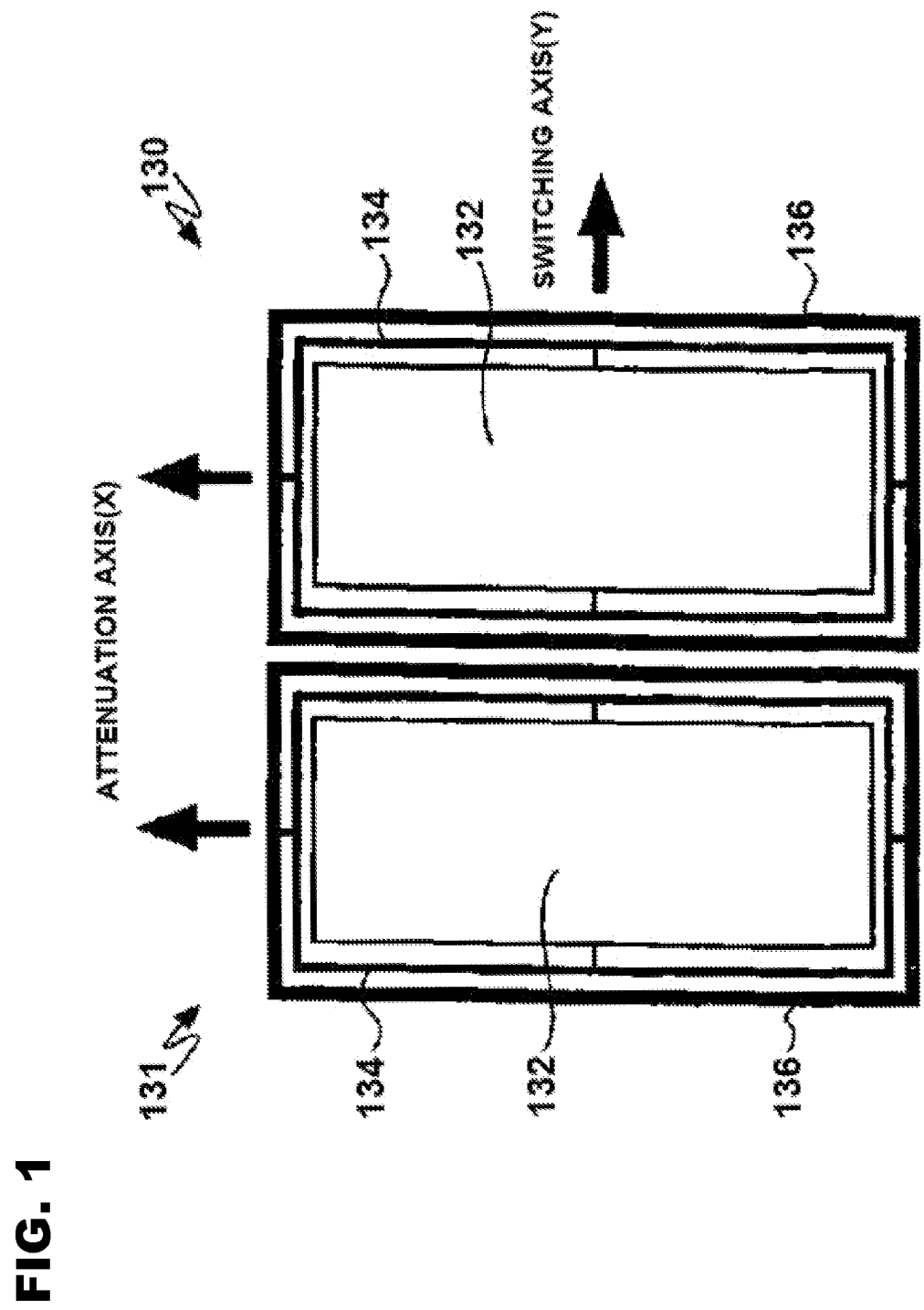
FIG. 1 depicts the attenuation reflection element of traditional WSS.
Figure 2:
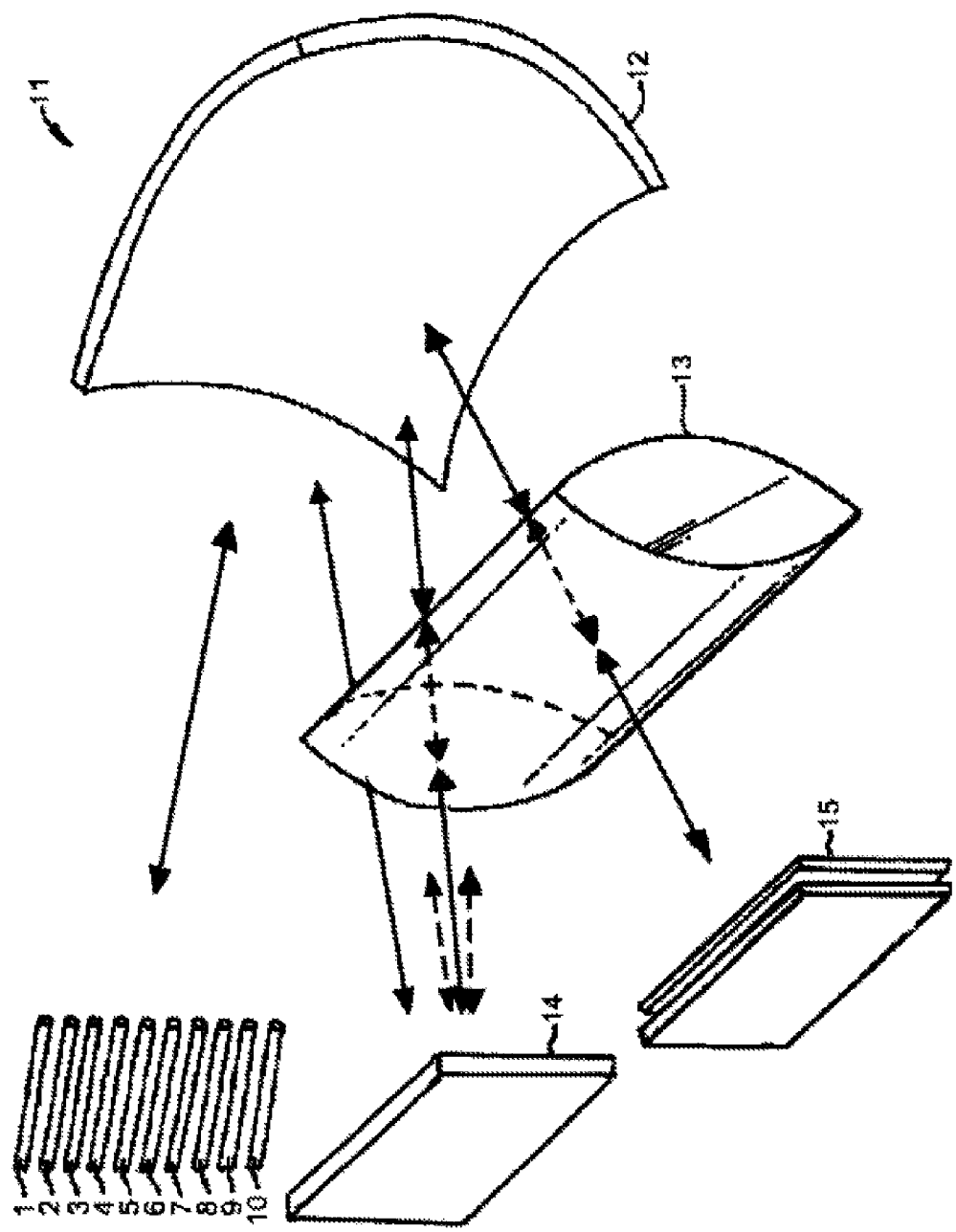
FIG. 2 is the structural diagram of traditional WSS based on an LCD technology.
Figure 3:
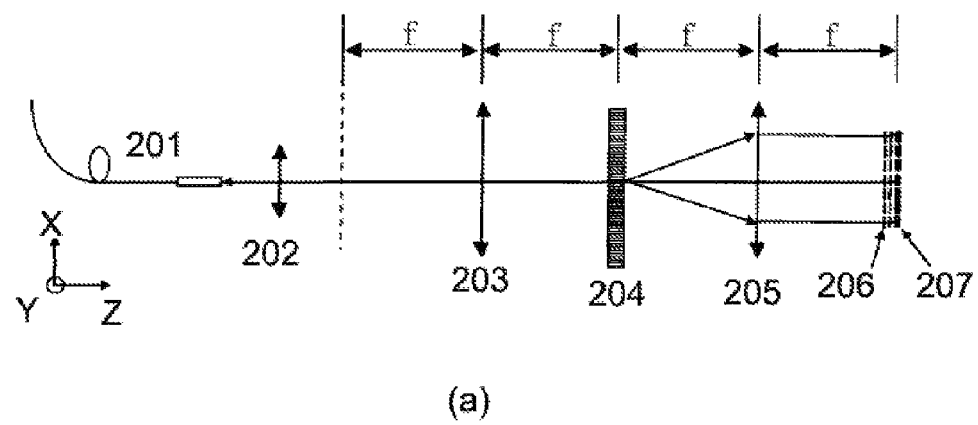
FIG. 3 is a structural diagram of the optical path of the present invention, where (a) is the front view and (b) is the side view of the attenuation reflection element.
Figure 3:
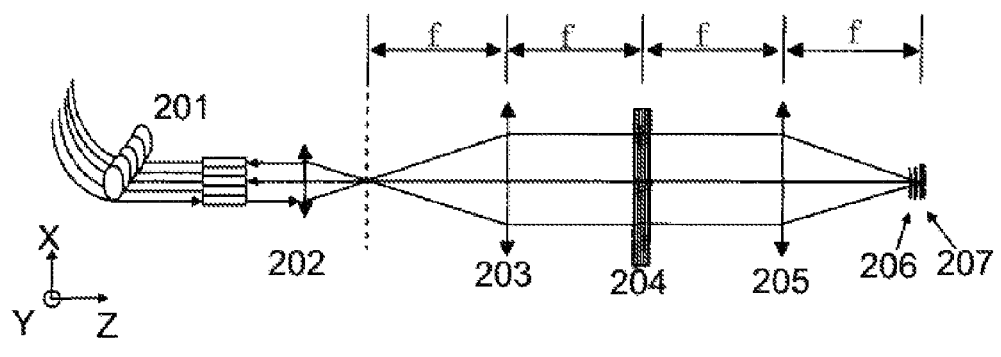

FIG. 3 shows the overall system structure diagram of an exemplary wavelength selective switch (WSS) with hitless switching according to the present invention. The WSS includes the fiber collimator arrays (201), focusing lens (202), collimating lens (203), diffraction grating (204) and focusing lens (205), arranged in the same order as listed. Positioned on the other side of the focusing lens is the attenuation reflection array, which has a plurality of channel attenuation reflection units.

The attenuation reflection array includes interconnected transmission-type MEMS attenuators (206) and a one-dimension MEMS reflector (207). The transmission-type MEMS attenuator (206) is positioned in the front of the one-dimension MEMS reflector (207).

The central axis of the transmission-type MEMS attenuator (206) aligns and coincides with that of the one-dimension MEMS reflector (207), with the two central axes being glued together.

The optical input signal is input from one port, i.e. the input port of the fiber collimator array (201), other ports of the fiber collimator array (201) are output ports, and their quantity is from 1 to N. The optical input signal is at lens focus when passing by the focusing lens (202). This focus is also the focus of the next collimating lens (203). After passing by the focus, the optical input signal continues to transmit to the collimating lens (203). After the optical input signal passes through the collimating lens (203), the parallel beam is separated by the diffraction grating (204) as single-channel optical signals, arranged in order. After passing through the diffraction grating (204), the focusing lens (205) focuses and distributes channel optical signals with different wavelengths at different positions on focal plane of focusing lens, that is to say, focus to each channel attenuated reflection element. The attenuated reflection unit consists of a number of channel attenuated reflection elements. The transmission-type MEMS attenuator (206) and one-dimension MEMS reflector (207) exist in an array. The one-dimension MEMS reflector (207) corresponding to each channel realizes the switching function of the channel through rotation around the X axis. The transmission-type MEMS attenuator (206) in front of the one-dimension MEMS reflector (207) realizes WSS attenuation and hitless switching.

After passing by the transmission-type MEMS attenuator (206), placed in front of the focal plane, the light ray enters into the reflecting surface of the one-dimension MEMS reflector (207) on the focal plane. The one-dimension MEMS reflector (207) placed on the focal plane corresponds to the distributed wavelength band with a certain width. After reflected on this surface and passing through the transmission-type MEMS attenuator (206), focusing lens (205), diffraction grating (204), collimating lens (203) and focusing lens (202), the light ray enters into a port of the array collimator and then enters optical fibers. The angle of the one-dimension MEMS reflector (207) determines the position of port that the returned light ray enters; that is to say, it realizes the switch selection from any wavelength to any port. The reflector in the attenuation reflection unit through rotation around the Y axis realizes the deflection of the channel wavelength optical signal incidence to the mirror face so that optical path can be correspondingly deflected to the output port of the target address. The amount of attenuation of transmission-type MEMS attenuator can be changed to realize the function of attenuation. The MEMS attenuator in the attenuated reflection unit can set the amount of attenuation to the maximum value before switching, thereby realizing the function of hitless switching.

Figure 4:
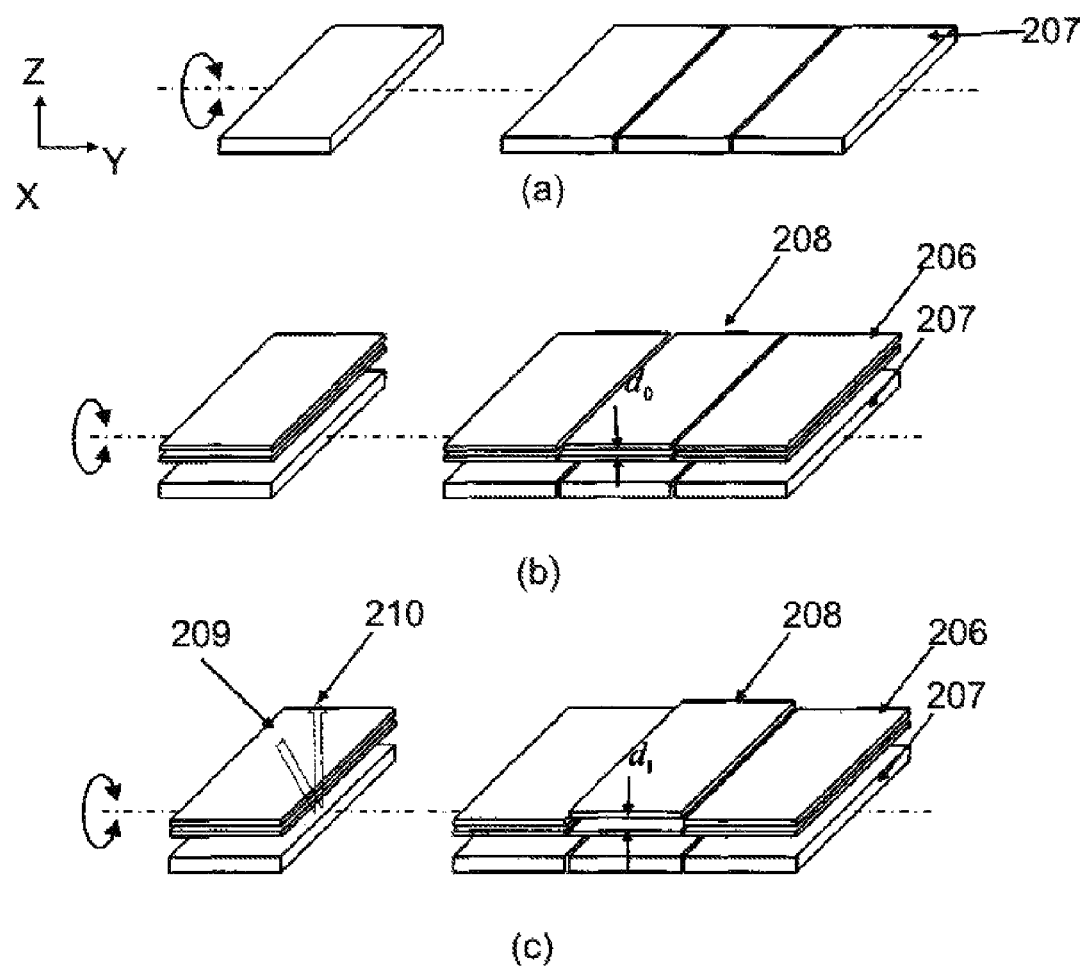
FIG. 4 is a working schematic diagram of the attenuation reflection element of the present invention.

An example of the one-dimension MEMS reflector (207) employed in the present invention is shown in FIG. 4 (a). The working principle of the attenuation reflection unit is described as follows: with reference to FIG. 4 (b) and FIG. 4 (c), the light ray (209) attenuates after passing by the transmission-type MEMS attenuator (206), and then incises the mirror face of the one-dimension MEMS reflector (207). After the light ray reflects on the mirror face, it passes by the transmission-type MEMS attenuator (206) again. Then, the transmission-type MEMS attenuator (206) gives off a light ray (210). Because the transmission-type MEMS attenuator (206) does not deflect the angle of the light ray, when the one-dimension MEMS reflector (207) deflects around the Y axis, the light ray (210), coming out of the transmission-type MEMS attenuator (206), also deflects. Therefore, the amount of attenuation of the light ray is the summation of the amount of attenuation when the light ray passes by the transmission-type MEMS attenuator (206) in the first time and in the second time, and the angle is decided by the corner of the one-dimension MEMS reflector (207). Adjust the amount of attenuation of the transmission-type MEMS attenuator (206) to realize the regulation of the total amount of attenuation. When the total amount of attenuation is more than 35 dB, the blocking function is deemed to have reached. Therefore, when the one-dimension MEMS reflector realizes optical path switching, the transmission-type MEMS attenuator (206) should be regulated to realize the attenuation of optical signal and hitless switching of optical path.

Figure 6:
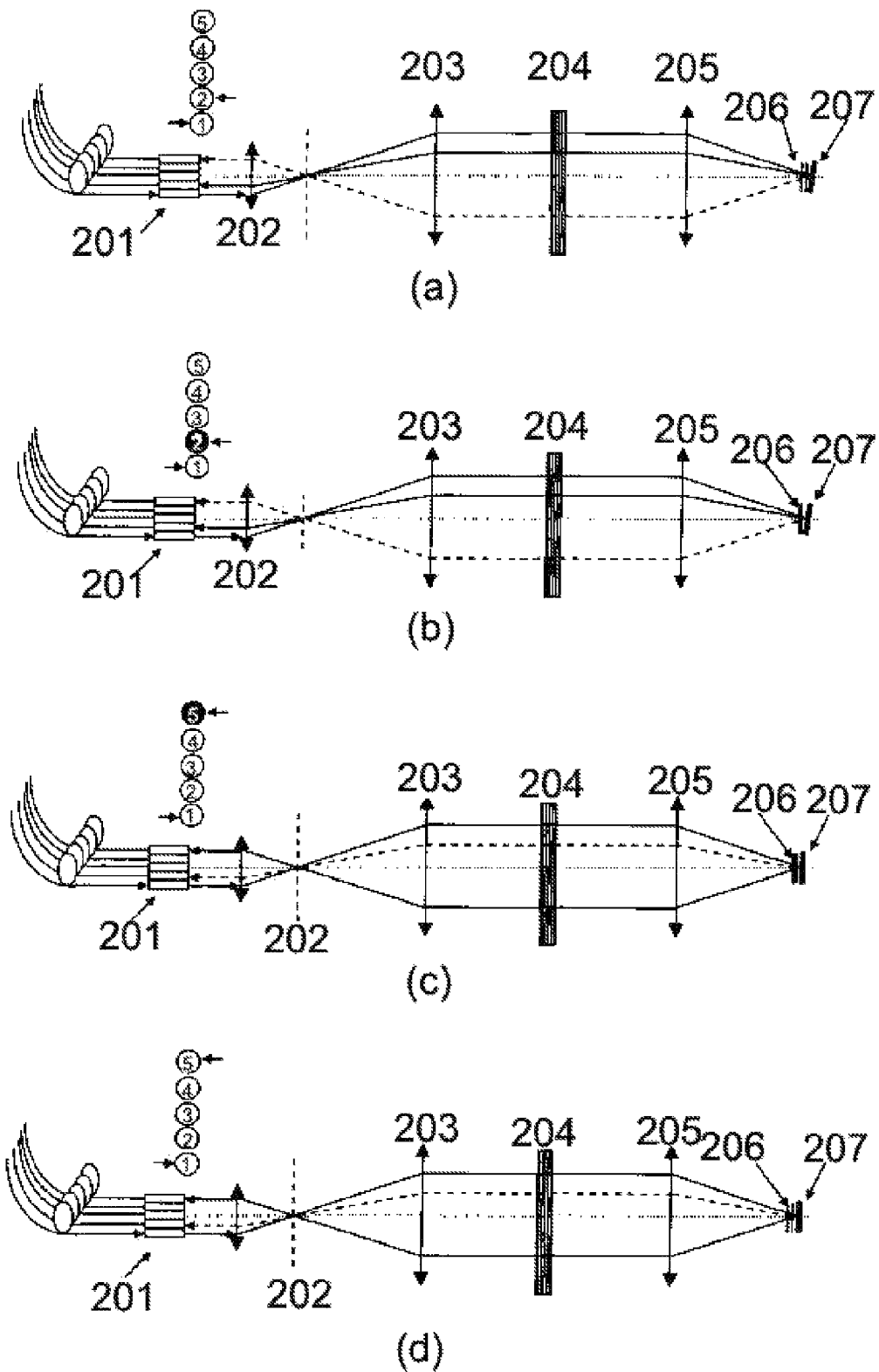
FIG. 6 is a working process diagram of a particular embodiment of the present invention.

An exemplary operation process is shown in FIG. 6. In the drawings, the port numbers are referenced to by ①, ②, ③, ④, and ⑤. FIG. 6 (a) indicates signal inputs from input port ① and outputs from output port ②. The process indicated from FIG. 6 (a) to 6(b) is to switch form one route: input from port ① and output from port ② to another route: input from port ① and output from port ⑤. Firstly, regulate the amount of attenuation of transmission-type MEMS attenuator to the maximum value, i.e. the hitless function, as shown in FIG. 6(b); secondly, set the rotation degree of one-dimension MEMS reflector, corresponding to the address of port ⑤, so that the optical path is adjusted as: input from port ① and output from port ⑤. At this point, the corresponding attenuation of this channel is still at the maximum amount, i.e., at the state of Hitless, a shown in FIG. 6(c); then, regulate the attenuation of transmission-type MEMS attenuator to the required state, i.e., the state of removing the blocking, as shown in FIG. 6(d).

The above transmission-type MEMS attenuator is realized on the basis of the multiple-beam interference principle, that is, the change of the distance between the two parallel high reflectivity planes can cause changes in the interfering strips which can be utilized to realize attenuation of the signal. Shown in FIG. 4, 206 is a transmission-type MEMS attenuator, 207 is one-dimension MEMS reflector, 208 is another transmission-type MEMS attenuator neighboring to 206. In FIG. 4 (a) only shows the schematic diagram of the one-dimension MEMS reflector, FIGS. 4 (b) and (c) show the schematic diagrams of the one-dimension MEMS reflector and transmission-type MEMS attenuator. The transmission-type MEMS attenuator in FIG. 4 (b) is in the state where the distance between parallel planes is not changing and the distance is $d_0$. In FIG. 4(c), 208 is in the state where the distance between parallel planes is changed and the distance is now $d_1$.

Figure 5:
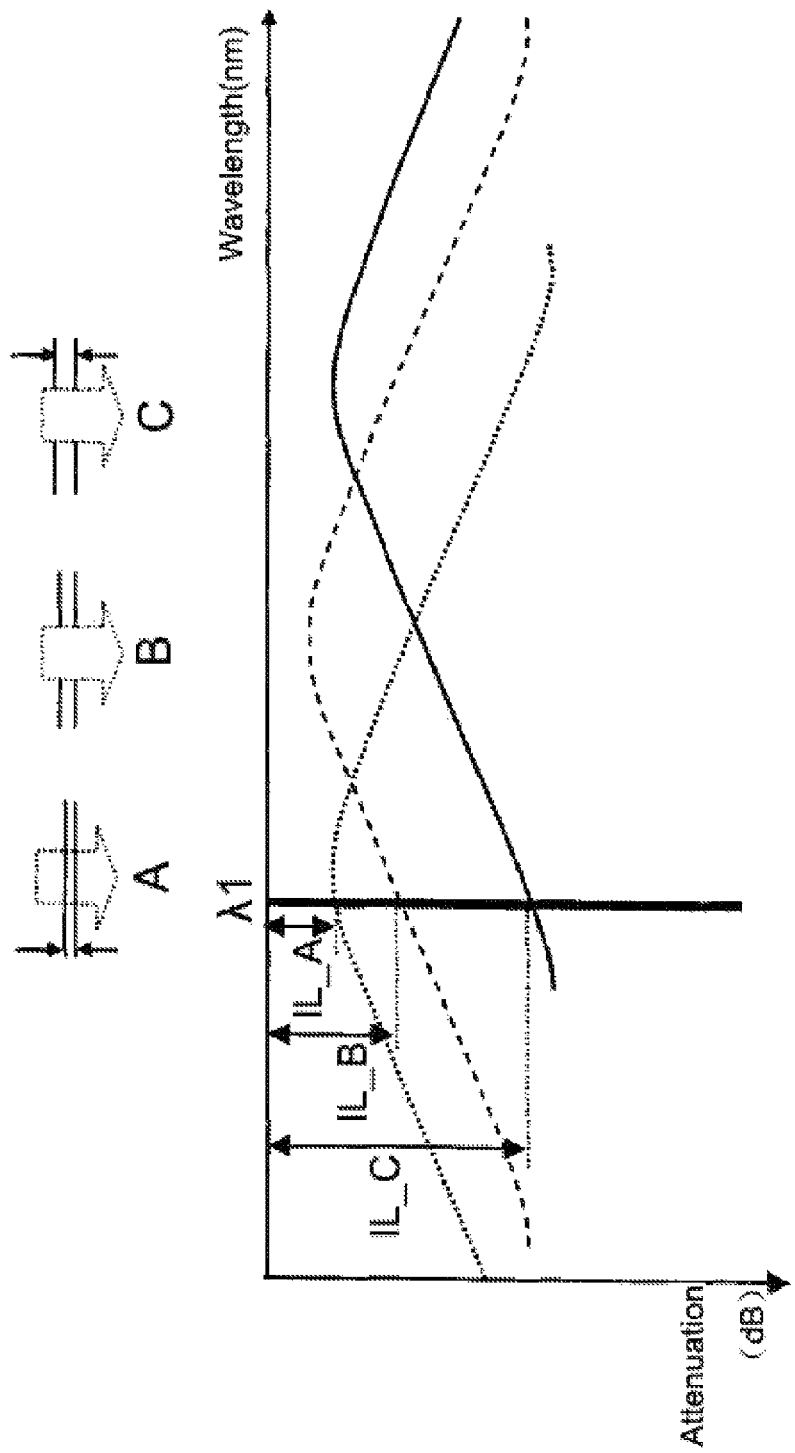
FIG. 5 is a working schematic diagram of the transmission-type MEMS attenuator of the present invention.

FIG. 5 describes the attenuation change arising from the change in distance between the two parallel planes of the transmission-type MEMS attenuator as shown in FIG. 4. When the distance changes, the states A, B, and C corresponding to three different distances, aiming at insertion loss, decline from IL_A to IL_B and then to IL_C.

While there have been described and pointed out fundamental novel features of the invention as applied to a preferred embodiment thereof, it will be understood that various omissions and substitutions and changes in the form and details of the embodiment illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

What is claimed is:

1. A wavelength selective switch (WSS) with hitless switching, comprising an attenuation-reflection unit array, said attenuation reflection unit array comprising a plurality of attenuation-reflection units each of which comprises an interconnected transmission-type MEMS attenuator and a one-dimension MEMS reflector, wherein said transmission-type MEMS attenuator is a MEMS which allows a light ray to pass there-through and attenuates said light ray while passing there-through.

2. The wavelength selective switch of claim 1, wherein said transmission-type MEMS attenuator is positioned in front of said one-dimension MEMS reflector.

3. The wavelength selective switch of claim 1, wherein central axis of said transmission-type MEMS attenuator aligns and coincides with central axis of said one-dimension MEMS reflector.

4. The wavelength selective switch of claim 1, wherein said central axes of said transmission-type MEMS attenuator and said one-dimension MEMS reflector are linked with each other.

5. The wavelength selective switch of claim 1, further comprising a fiber collimator array, a focusing lens, collimating lens, a diffraction grating, and a focusing lens.

6. The wavelength selective switch of claim 1, wherein said transmission-type MEMS attenuator comprises two parallel high reflectivity planes.

7. The wavelength selective switch of claim 6, wherein said two parallel high reflectivity planes of said transmission-type MEMS attenuator are separated by a changeable distance.

8. The wavelength selective switch of claim 7, wherein said transmission-type MEMS attenuator realizes attenuation through changing said changeable distance between said two parallel high reflectivity planes.

* * * * *